July 29, 1924.
E. G. GUNN
MOTOR VEHICLE
Filed Nov. 14, 1919
1,503,239
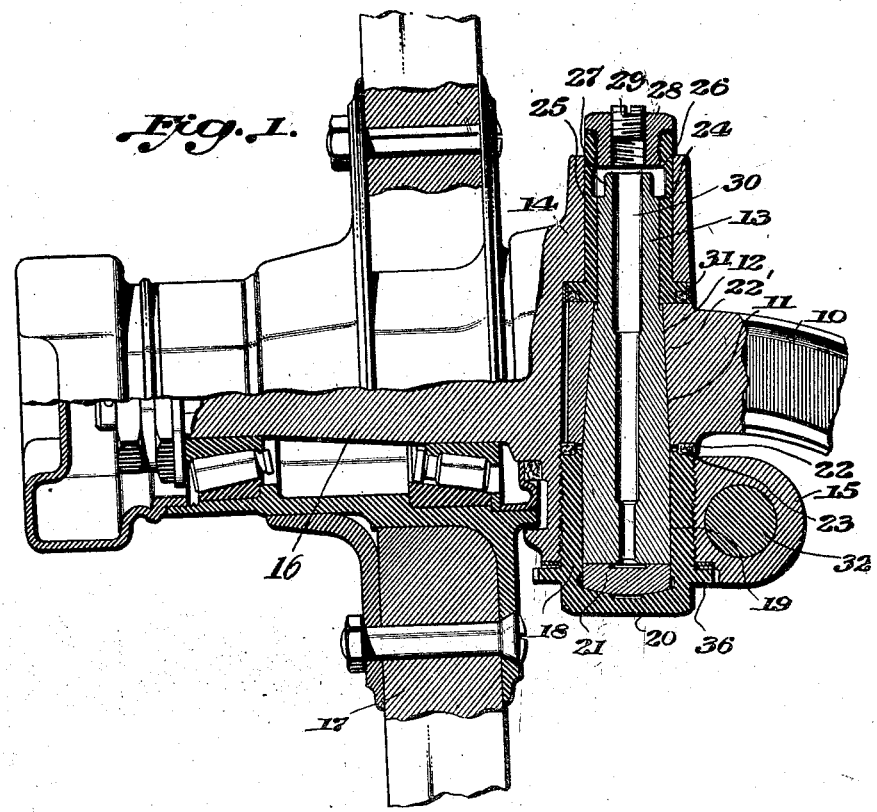
Fig. 1.
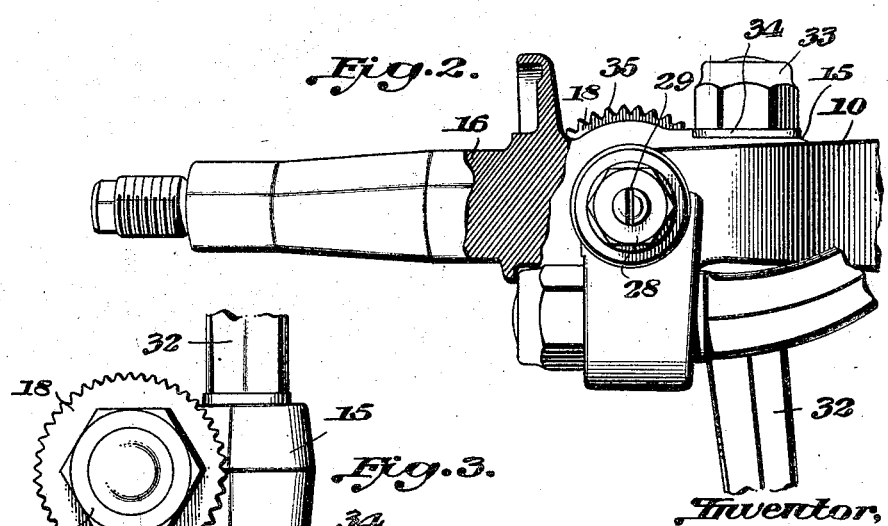
Fig. 2.
Fig. 3.
Inventor,
Earl G. Gunn, Patented July 29, 1924.

1,503,239

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed November 14, 1919. Serial No. 338,107.

*To all whom it may concern:*

Be it known that I, EARL G. GUNN, a citizen of the United States, and resident of Detroit, Wayne County, State of Michigan, have invented certain new and useful Improvements in Motor Vehicles, of which the following is a specification.

This invention relates to motor vehicles and more particularly to steering knuckle mechanism therefor.

The invention has for its object to provide a steering knuckle mechanism that will be simple in construction, efficient in operation, and, moreover, a construction that may be easily assembled and taken apart should occasion arise.

Another object is to provide means for efficiently lubricating a steering knuckle joint.

Another object is to provide a construction in which the weight of the vehicle retains the axle on the pivot pin of the knuckle joint.

Another object is to provide a construction in which the various cooperating parts will be securely locked together against accidental displacement.

Other objects will appear as the description of the invention proceeds.

One embodiment of the invention has been illustrated in the accompanying drawing, and in this drawing Fig. 1 is a side elevational view, partly in section, illustrating my improved steering knuckle mechanism;

Fig. 2 is a top plan view, partly broken away, and partly in section, of the construction shown in Fig. 1, the wheel hub not being shown in this view; and Fig. 3 is an enlarged detail view illustrating the locking means for the cap or bushing which supports the steering knuckle pin.

In the embodiment of the invention shown in the drawings the axle 10 of the vehicle is provided with a tapered seat 11, this tapered seat engaging a tapered intermediate portion 12 of the steering knuckle pin 13. The pin 13 is supported on knuckle members 14 and 15, preferably formed integrally with the spindle 16, which in turn is supported by the vehicle wheel 17 in the usual manner. The knuckle members 14 and 15 are vertically spaced as illustrated in the drawings, the lower knuckle member 15 being provided with a screw threaded cap or bushing 18 which supports the pivot pin 13, this cap having a cylindrical bearing portion 19 and carrying intermediate its head 20 and the pin 13 a thrust bearing disk 21. The upper end 22 of the cap 18 is spaced from the apertured free end of the axle 10, this end of the axle forming one section of the knuckle member and, therefore, this portion of the axle will be referred to as knuckle member 22'. A dust excluding washer 23, preferably formed of cork or felt, is interposed between the upper end of the cap 18 and the knuckle member 22', as illustrated in Fig. 1. The upper knuckle member 14 is provided with a bushing 24 having a cylindrical bearing portion adapted to engage the upper cylindrical bearing surface 25 formed on the pin 13, this bushing having an annular cut-away portion 26 which forms, with a recessed portion 27 of the upper end of the pin 13, an oil pocket. A plug 28 is carried by the bushing 24, these members being screw threaded and plug 28, therefore, being easily removable. A second screw plug 29 is carried by the plug 28 and by removing this plug the oil pocket formed by the portions 26 and 27 respectively of the bushing and the pin may be filled with oil. The pin 13 as illustrated in Fig. 1 is hollowed out centrally as shown at 30 in order to permit the passage of oil longitudinally thereof to the thrust bearing 21. A dust excluding washer 31 is interposed between the lower end of the bushing 24 and the upper end of the knuckle member 22', this construction also being shown in section in Fig. 1.

Means has been provided for preventing the accidental loosening or removal of the cap 18 and this means will next be described. The knuckle member 15 receives in the usual manner the steering knuckle arm 32, this arm being screw threaded on one end, the screw threaded end being secured to the knuckle member 15 by means of a nut 33. A washer 34 is interposed between the nut 33 and the knuckle member 15 and this washer is adapted to engage one of a plurality of peripheral serrations 35 formed on the periphery of a flange 36, which in turn is formed on the cap 18. When the cap has been adjusted to proper position therefore the nut 33 and the washer 34 effectively lock this cap against turning, thereby securing the parts together.

From the above description of the invention it will be seen that I have provided a simple construction and a construction well adapted to fulfill the purposes for which it was designed. By the mounting of the knuckle members and the knuckle pin in the manner specified, it will also be seen that the weight of the vehicle on the axle 10 will maintain the knuckle member 22' or the free end of the axle in engagement with the pivot pin at all times. Means has also been provided for efficiently lubricating the knuckle joint and for locking the cooperating members against accidental displacement.

While I have in the above specification described one specific embodiment of my invention, it will be understood that the invention is capable of modification and that modifications and changes may be made in the construction and in the arrangement of the cooperating parts without departing from the spirit and scope of the invention as expressed in the following claims.

What I claim and desire to secure by Letters Patent is:

1. A steering knuckle comprising in combination a knuckle member, a pin engaging said knuckle member, a second knuckle member, means carried by said second knuckle member for supporting said pin, a steering knuckle arm carried by said second knuckle member and single means for securing said arm on said knuckle member and for locking said pin supporting means on said second knuckle member.

2. A steering knuckle comprising in combination a knuckle member, a pin engaging said knuckle member, a second knuckle member, a cap carried by said second knuckle member for supporting said pin, a steering knuckle arm carried by said second knuckle member and single means for securing said arm on said second knuckle member and for locking said cap on said second knuckle member.

3. A steering knuckle comprising in combination a knuckle member, a pin engaging said knuckle member, a second knuckle member, a cap having peripheral serrations carried by said second knuckle member for supporting said pin, a steering knuckle arm carried by said second knuckle member and single means for securing said arm on said second knuckle member and engaging the serrations in said cap for securing said cap on said second knuckle member.

In testimony whereof I affix my signature.

EARL G. GUNN.